United States Patent [19]

Bourke et al.

[11] 4,246,522

[45] Jan. 20, 1981

[54] POWER CONVERTER WITH PROGRAMMABLE COMMUTATION

[75] Inventors: Robert F. Bourke, Kamiah, Id.; David M. Thimmesch, Elgin, Ill.

[73] Assignee: Gould Inc., Rolling Meadows, Ill.

[21] Appl. No.: 943,872

[22] Filed: Sep. 19, 1978

[51] Int. Cl.³ .............................................. H02P 5/16
[52] U.S. Cl. .................................. 318/338; 318/345 C; 318/345 G; 318/493; 363/124; 363/54; 363/57
[58] Field of Search ............... 318/139, 341, 332, 338, 318/345 C, 345 G, 493; 363/124, 138, 54, 57

[56] References Cited

U.S. PATENT DOCUMENTS

| | | | |
|---|---|---|---|
| 3,938,015 | 2/1976 | Beebe | 318/139 |
| 3,993,942 | 11/1976 | Schmidt et al. | 318/341 |
| 4,008,423 | 2/1977 | Christianson | 318/139 |
| 4,017,777 | 4/1977 | Bailey | 363/124 |
| 4,032,825 | 6/1977 | Klinio | 318/341 |
| 4,074,175 | 2/1978 | Born et al. | 318/332 |

Primary Examiner—David Smith, Jr.

[57] ABSTRACT

A power converter having improved efficiency and useful, for example, in the propulsion system of an electric vehicle. The power converter includes a dual chopper having an output level variable over a rather wide range for controlling the speed of the vehicle from stop to cruising. A commutating inverter is transformer coupled to the chopper for commutating thyristors in the chopper. Efficiency is considerably enhanced by programming the amount of energy in the commutating inverter in accordance with the power being delivered by the chopper so as to minimize power losses and thereby increase the range of the vehicle.

10 Claims, 9 Drawing Figures

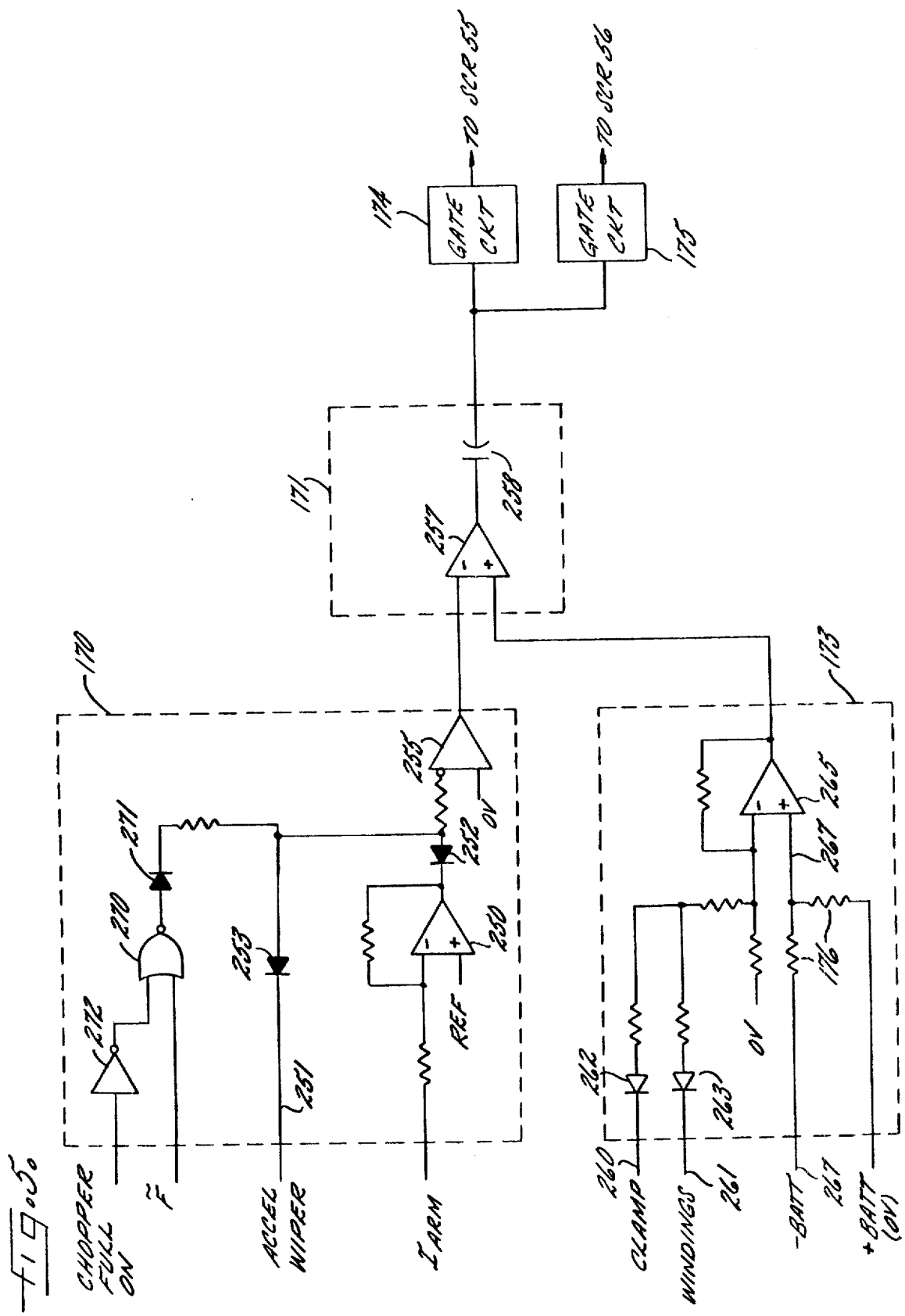

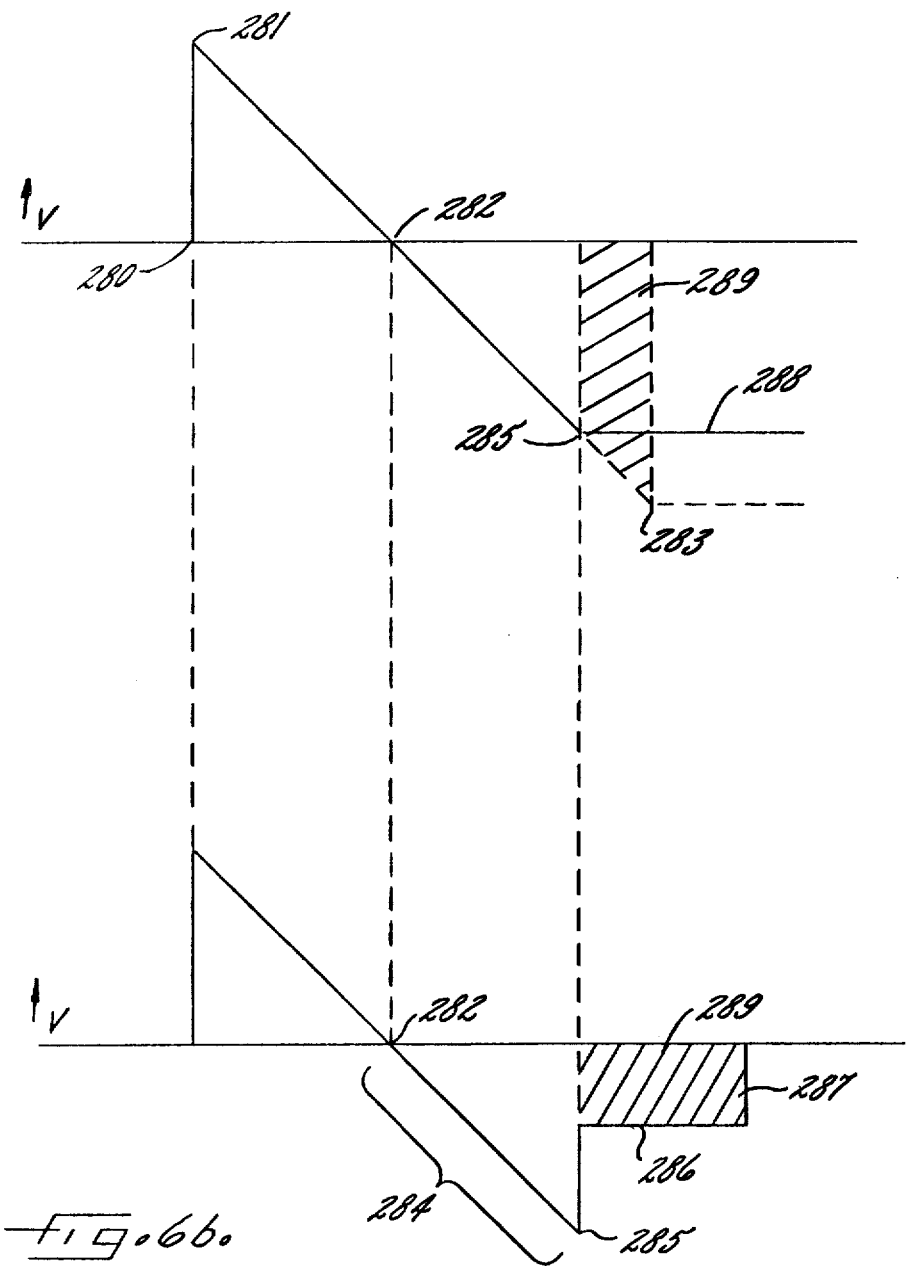

POWER CONVERTER WITH PROGRAMMABLE COMMUTATION

This invention relates to power converters, and more particularly to an improved converter having enhanced efficiency.

Christianson and Bourke U.S. Pat. No. 3,958,173 describes a power converter capable of use in an electric vehicle for controlling a DC propulsion motor. Christianson and Bourke U.S. Pat. No. 4,008,423 describes an electrical vehicle using that converter and having mode switching means for control of the motor armature and the motor field in respective modes. Those patents describe electric vehicle apparatus which was reasonably successful in meeting its objectives. However, because of the very nature of electrical vehicles and the batteries which power them, it is important to optimize the overall system as well as its various elements in order to maximize efficiency and thereby extend the range of the vehicle for a power source capable of storing a given amount of energy.

The invention described and claimed in the instant application represents an improvement in power converters, applicable to the patented system as well as others and capable of producing a significant increase in efficiency.

The system described in the aforementioned patents utilizes a duty cycle controlled dual chopper having a transformer coupled commutating inverter for causing the thyristors in the main chopper to switch off. The controller has two modes of operation, a low speed, high torque mode wherein the chopper supplies armature current and a high speed or cruising mode wherein the chopper supplies field current. In the respective modes, the element (armature or field) not connected to the chopper is connected directly across the battery. Chopper currents in the armature mode can range to about 500 amps, while chopper currents in the field mode are typically on the order of 5-10 amps. The transformers which couple the commutating inverter to the chopper include clamp windings connected in series with diodes across the battery power supply so as to set a limit for the voltage imposed across the commutating inverter capacitors, and thereby the amount of energy in the commutating inverter. The turns ratio of the clamp windings was selected to establish an amount of energy in the commutating inverter capable of commutating the heaviest chopper load. As a result, when the chopper is not operating at maximum level, as it is not in most circumstances, higher than necessary currents flow in the commutating inverter and clamp circuit.

With the foregoing in mind it is the general aim of the present invention to increase efficiency in an auxiliary commutated power converter by supplying only so much commutation capability as is needed for the particular operating level of the converter.

More specifically, it is an object of the present invention to provide a power converter with a commutating inverter wherein energy in the commutating inverter is programmed according to the operating level of the converter. Among the advantages attributable to such structure are an increase in overall efficiency, reduced heating of the elements in the commutating inverter, and in the case where the converter and inverter operate in the audio frequency range, a reduction in audio frequency noise.

Other objects and advantages will become apparent with reference to the following detailed description when taken in conjunction with the drawings in which:

FIG. 5 is a schematic diagram showing programmable commutation circuitry according to the present invention; and FIGS. 6 and 7 are diagrams illustrating the operation of the programmable commutation circuitry of FIG. 5.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
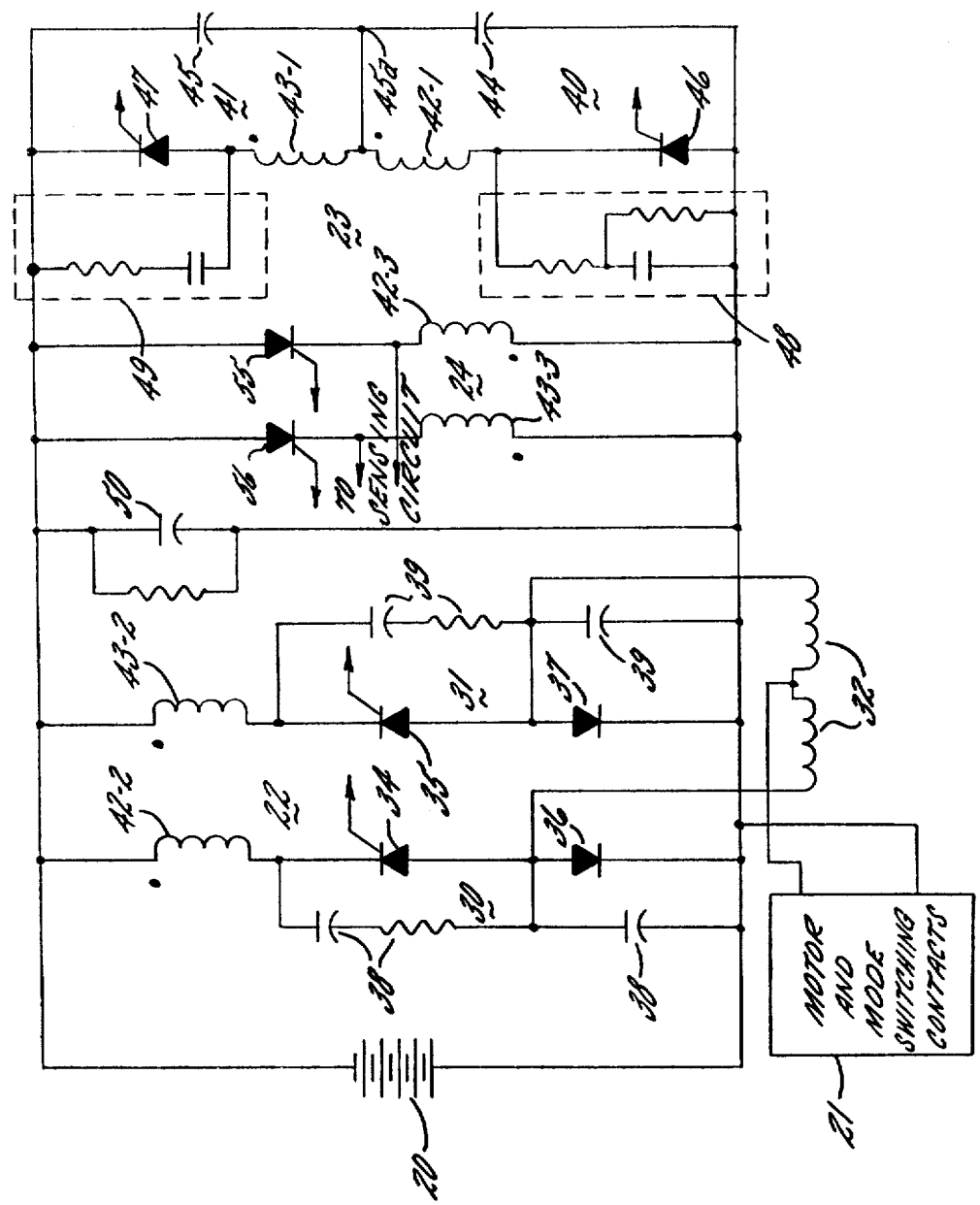
FIG. 1 is a schematic diagram illustrating the power elements of a chopper and commutating inverter.

Turning now to FIG. 1, there is shown the power portion of the converter circuit in the environment of a battery powered electric vehicle including a main propulsion battery 20, a propulsion motor and its associated switching components indicated diagramatically at 21, a main chopper circuit 22, a commutating inverter 23, and means for programming the level of energy in the commutation circuit 24. The propulsion battery 20 may be a conventional lead acid storage battery or other high energy density storage battery. In one embodiment of the invention it was found convenient to use a storage battery of about 65 volts nominal terminal voltage. As will be described in more detail in connection with FIG. 3, the propulsion motor 21 is preferably a separately excited DC motor having a contactor switching arrangement for powering the motor in an armature control mode for low speed and high torque and in a field control mode for higher speeds.

The main chopper 22 is configured as a dual chopper having a pair of legs 30, 31 driven out of phase with respect to each other and at a variable duty cycle, the outputs of the legs being combined in an interphase transformer 32. The legs include respective thyristors, shown herein as SCR's 34, 35 and associated freewheeling diodes 36, 37. Snubbing components 38, 39 are provided for reducing transients.

Associated with the chopper 22 for switching the thyristors in the chopper off, a commutating inverter 23 is provided, having sections 40, 41 associated with the respective chopper legs 30, 31. The commutating inverter 23 is transformer coupled to the chopper, a first transformer having a primary 42-1 magnetically coupled to a secondary 42-2 serially connected in the chopper leg 30. Similarly, the section 41 has a transformer primary 43-1 magnetically coupled to a secondary 43-2 in the chopper leg 31. The commutating inverter also includes energy storage means shown herein as a pair of capacitors 44, 45 which resonate with the aforementioned primaries under the control of thyristors shown herein as SCR's 46, 47 for delivering energy to the associated legs of the chopper for commutation thereof. As in the case of the chopper, snubbing components 48, 49 are provided for reducing transients. In addition, a network including capacitor 50 is connected across the power supply near the commutating inverter for providing a low impedance AC path for charging the commutating capacitors.

The chopper and commutating inverter cooperate in the following manner to produce current pulses of controlled duration, combined by the interphase transformer for delivery to the motor. Assuming a point in the cycle at which SCR 34 is intended to become conductive, gating circuitry to be described below triggers the SCR 34 which causes current flow from the positive terminal of the battery 20, through the motor 21, the SCR 34, the secondary 42-2 to the negative terminal of the battery. At the point in the cycle where the current pulse is to terminate, the commutating SCR 46 is triggered. As a result of previous cycles of the commutating inverter, energy is stored in capacitors 44, 45 in the form of a voltage, with the junction 45a being negative with respect to the positive bus. As a result, when the SCR 46 is triggered, the voltage present on the capacitors 44, 45 instantaneously appears across the primary 42-1. By transformer action, a voltage determined by the turns ratio of the transformer 42 is induced across the secondary 42-2. That voltage, being properly polled, is sufficient to reverse bias the SCR 34, thereby commutating it. It is, of course, necessary to transfer sufficient energy through the transformer to maintain the reverse bias for a sufficient time, dependent on the conducting state of the SCR 34 to assure commutation of the SCR.

When the SCR 34 commutates, motor current continues to flow through the free-wheeling diode 36. Upon triggering of the SCR 46 in the commutating inverter, energy is transferred from the capacitors 44, 45 to the primary 42-1 as current flow increases through the SCR 46. After the capacitors are discharged, current flow will continue by virtue of resonance between the primary 42-1 and the capacitors, charging the capacitors in the opposite direction. During the conducting interval of the SCR 46, energy is also flowing from the battery through the SCR 46 to charge the capacitors in preparation for the next commutating cycle. The chopper leg 31 cooperates with the commutating inverter section 41 in the manner just described.

Because the commutating inverter is a low loss circuit, especially in the case where the chopper load is light, at each resonant cycle the voltage at the junction 45a of capacitors 44, 45 will increase by about the magnitude of the battery voltage. If that voltage increase were allowed to go unchecked, it could reach potentially damaging level. To prevent that in the system described in the aforementioned patents, clamp windings are associated with each of the transformers and connected in series with respective diodes across the battery. The turns ratio is selected to forward bias the diodes at a point in the resonant cycle of the commutating inverter wherein sufficient energy is present to commutate the worst case chopper load. As will be pointed out below, that voltage could be on the order of 300 volts. The amount of energy represented by that voltage is necessary in cases where the chopper is conducting heavily, for example at 500 amps, to transfer sufficient energy into the chopper to reverse bias the chopper SCR for a sufficient time to assure that it commutated. In cases where the chopper is only lighted loaded, as in normal cruising, the amount of energy circulated through the commutating inverter and returned to the battery through the clamp circuit was much greater than necessary, resulting in unneeded power losses, increased heat generation and excessive audio frequency noise.

In accordance with the present invention, the amount of energy in the commutating inverter 23 is programmed in accordance with the demands of the chopper 22 so that sufficient, but not excessive energy is available for commutating the chopper without generating unneeded losses. To that end, the respective transformers 42, 43 are provided with clamp windings 42-3, 43-3, such clamp windings having an increased number of turns so that a voltage equal to the battery terminal voltage is induced therein rather early in the commutating inverter resonant cycle. In addition, there are provided a pair of switch means, shown herein as SCR's 55, 56, serially coupled with the respective clamp windings 42-3, 43-3 across the battery 20. Means are provided responsive to the operating level of the chopper 22 for gating the SCR's 55, 56 to clamp the voltage in the commutating inverter at a programmed point dependent upon such operating level. In contrast to the system described in the patents where the clamp point is determined solely by the turns ratio, in the present system the turns ratio allows clamping during a relatively large portion of the resonant cycle, with the clamp point for any given condition being determined by the operating level of the chopper. For example, assuming that SCR 47 has been triggered to commutate chopper leg 31 and the resonant exchange of energy in the commutating inverter is underway, the SCR 55 will become forward biased rather early in the cycle and when the voltage at the junction 45a reaches the programmed level, the SCR 55 will be triggered to impose the clamp at that point. The energy remaining in the primary 42-1 will then be returned to the battery leaving the voltage on the capacitors 44, 45 at the level existant when the clamp was imposed. In that way, the energy in the commutating inverter is programmed so that when the chopper 22 is operating to deliver rather light currents, the voltage at node 45a is substantially lower than such voltage when the chopper 22 is operating at a much higher level.

Figure 2:
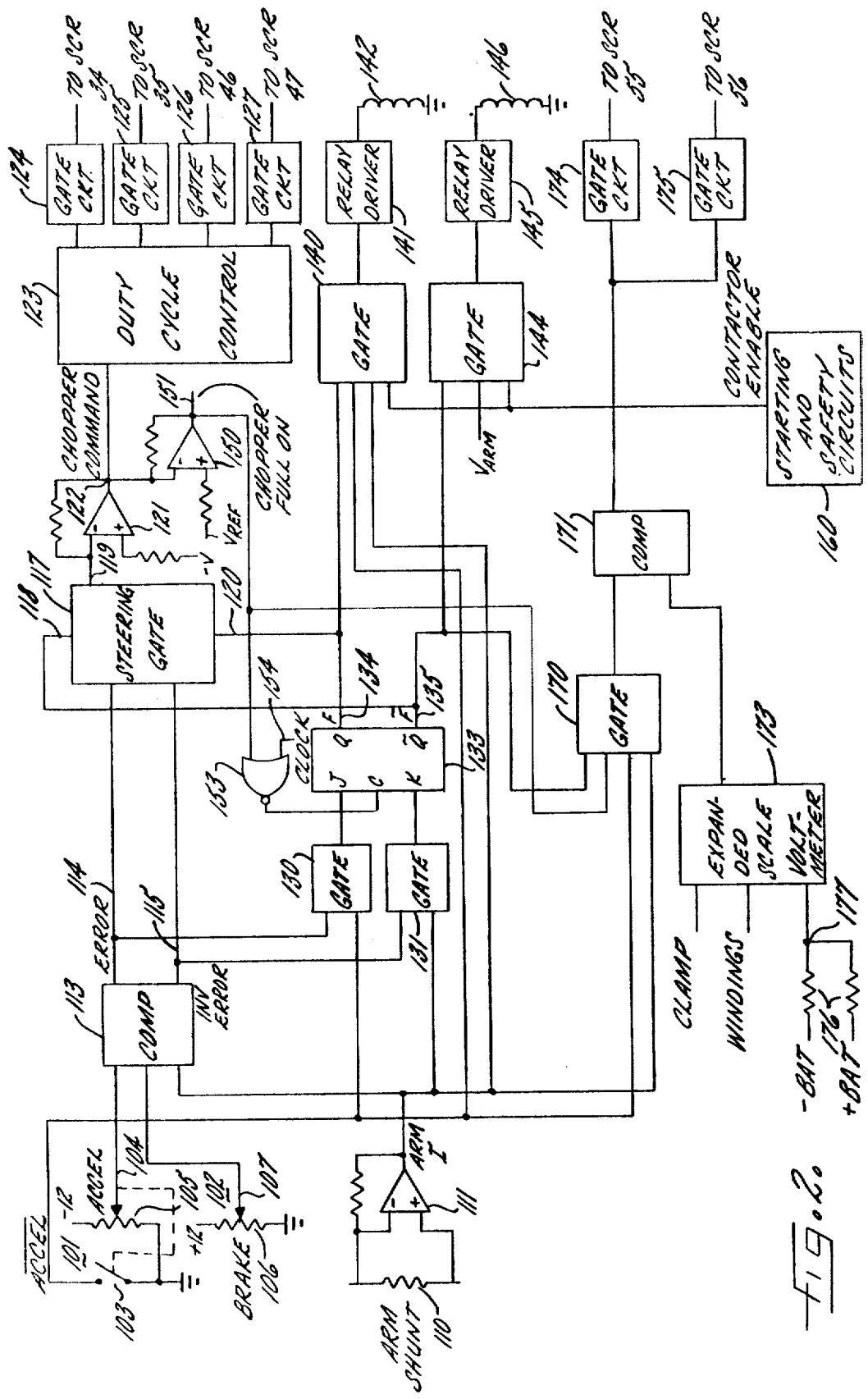
FIG. 2 is a block diagram showing control circuitry for the power converter of FIG. 1.

Turning now to FIG. 2, there is shown in simplified block diagram form the control circuitry for operating the power elements illustrated in FIG. 1. For allowing an operator to control the speed of the vehicle, accelerator controls 101 and brake controls 102 are provided. The accelerator controls comprise a switch 103 ganged to the wiper 104 of an accelerator potentiometer 105. When the accelerator pedal is depressed the switch 103 is closed, making the $\overline{ACCEL}$ signal low; the signal on the acceleration wiper 104 becomes increasingly negative with increased depression of the accelerator pedal. The brake control 102 is a potentiometer 106 having a wiper 107, the output signal of which becomes increasingly positive with increased depression of the brake pedal.

The preferred control system operates to produce an armature current in the propulsion motor which matches a demanded current, such current being demanded by either the position of the accelerator potentiometer 104 or the brake potentiometer 107. For sensing the actual armature current for comparison against the demanded current, an armature shunt 110 is provided, in series circuit relationship with the propulsion motor armature, and having a buffering amplifier 111 connected thereto for producing a signal indicative of actual armature current flow.

The demand signals from the accelerator and brake potentiometers and the actual signal from the armature shunt are coupled to a comparator 113 which compares the demand signal with the actual signal to produce an error signal on line 114 and an inverted error signal on line 115. When the accelerator is depressed, the negative signal from the potentiometer 105 is compared with the positive output of the scaling amplifier 111 which results from armature current flow to the motor. When the brake pedal is depressed, the positive signal from the potentiometer 106 is compared with the negative output of amplifier 111 which results from current flow from the motor to the battery. The comparator, in response to such conditions produces an error signal on line 114 indicative of the difference between the compared signals, and by virtue of an internal unity gain inverter, also produces an inverted error signal on line 115. Both of such signals are coupled as inputs to a steering gate 117 which selects one or the other of such signals for controlling the operating level of the power converter. The particular signal selected is dependent upon the mode in which the controller is operating at the time. In the armature control mode, the input 118 of the steering gate 117 is maintained in a high logic condition which causes the steering gate to pass the error signal 114 to its output 119. When operating in the field control mode, the input 118 is low, but the input 120 is maintained high, causing the inverted error signal on line 115 to be passed to the output 119. The signal passed by the steering gate 117 is buffered in an amplifier 121 to produce a chopper command signal on output line 122, such signal being coupled as a control input to the duty cycle control 123. As will be described below, the duty cycle control 123 acts through gating circuits 124-127 to trigger SCR's 34, 35, 46, 47 to control conduction in the respective legs of the chopper and thereby the duty cycle of the chopper.

Because the container has two modes, namely armature and field control, it is necessary for the duty cycle control 123 to respond differently in such modes to the error signal produced by the comparator 113. In the armature control mode, the non-inverted error signal is steered by virtue of the control input 118 through the steering gate to cause the duty cycle control 123 to increase the duty cycle from minimum toward maximum for increasing levels of error signal. However, in the field control mode, where the motor is controlled by field weakening, it is necessary to decrease the duty cycle to produce increased armature current. As a result, in the field control mode the inverted error signal 115 is passed through the steering gate 117 to cause the duty cycle control 123 to decrease the duty cycle of the chopper to produce increased armature current.

Means are provided for establishing the mode of the controller, not only to pass the appropriate signal through the steering gate 117, but also to control the power portion of the circuitry, described in connection with FIG. 1, to connect the motor armature and field to the controller and battery as required by the respective modes. To that end a pair of gating circuits 130, 131 are provided having inputs responsive to the error signal on line 114 and the inverted error signal on line 115, respectively, and having outputs coupled to the J and K inputs of a flip flop 133. The Q output 134 of the flip flop is high in the field control mode and low in the armature control mode. The $\overline{Q}$ output 135 assumes the opposite condition, such that it is low in the field control mode and high in the armature control mode. It is seen that the Q and $\overline{Q}$ outputs are the inputs 120, 118 respectively of the steering gate such that the error signal is passed through such gate in the armature control mode and the inverted error signal in the field control mode. The gate 130 is also connected to the accelerator switch 103, and the gate 131 connected to receive the armature current signal produced by the amplifier 111.

In operation, when the circuit is at rest, the flip flop 133 is maintained in its reset condition which, as will now be understood, establishes the armature control mode. The input 118 of the steering gate allows the error signal on line 114, if one is generated, to be passed to the duty cycle control 123. The Q output of the flip flop 133 provides an enabling signal to a gating circuit 140 connected to energize a relay driver 141 when the accelerator switch 103 is closed, which in turn energizes a relay coil 142 for closing contacts in the power circuit to set the circuit up in the armature control mode. The $\overline{Q}$ output of the flip flop 133 prevents gating circuit 144 from being energized, which maintains relay driver 145 and associated coil 146 de-energized. As will be noted below, this condition causes the chopper to be connected to the motor armature and the battery connected directly to the motor field.

When the accelerator is depressed the comparator 113 senses the demand for armature current and compares it to the actual armature current to produce a positive error signal 114 coupled through the steering gate 117 to cause the duty cycle control 123 to increase the duty cycle of the chopper, thereby to increase the armature current. The vehicle accelerates and armature current increases until it reaches the demanded level. However, if the duty cycle of the chopper reaches 100%, that is the controller is operating at maximum level, that condition will be sensed by an amplifier 150, responsive to the chopper command signal 122, which will respond by producing a low chopper-full-on signal at output 151. That signal enables NOR gate 153 to pass a clock signal derived from any convenient pulsed source 154 to clock the flip flop 133.

In the condition just described, assuming that the chopper has been run up to 100% duty cycle and additional armature current is demanded, the positive error signal coupled to the gate circuit 130 in combination with the logic zero $\overline{ACCEL}$ will maintain the output of gate 130 high. Similarly, the negative inverted error signal applied to the gate 131 will maintain that gate output low. The flip flop 133 when clocked with such signals on its J and K input will respond by shifting its output high and $\overline{Q}$ output low, thereby causing the system to enter the field control mode. As a result, the inverted error signal on line 115 will be passed through the steering gate 117, causing a reduction in duty cycle of the chopper, and thereby a further increase in armature current. When the flip flop 133 changes states, the Q and $\overline{Q}$ outputs acting respectively on gates 140, 144 cause the relay driver 141 to be de-energized and the relay driver 145 to be energized. As will be noted below, such condition causes the controller to be switched across the motor field and the battery to be connected directly to the armature.

Mode switching from the field control mode to the armature control mode occurs in a similar manner. Assuming that the system is in the field control mode, and that the actual armature current is greater than demanded, the inverted error signal 115 will act through the steering gate 117 to cause the duty cycle control 123 to increase the duty cycle of the chopper, thereby reducing the armature current. When the chopper-full-on signal at the output 151 of amplifier 150 is produced, it again allows clocking of flip flop 133. However, when that clock signal is produced, the negative state of the error signal on line 114 causes the output of gate 130 to be maintained low, whereas the positive state of the inverted error signal on line 115 causes the output of the gate 131 to be high. As a result, the clock signal will cause the flip flop to respond by switching its Q output low and $\overline{Q}$ output high, thereby returning to the armature control mode. The steering gate 117 and relay drivers 141, 145 respond in the manner described heretofore.

Control of the gates 130, 131 by the error and inverted error signals has been described. The gate 130 also has an input driven by the $\overline{ACCEL}$ signal which maintains the gate output low unless the accelerator is depressed, in order to prevent switching to the field control mode except when the accelerator is depressed. The gate 131 also has a second input which is connected to the armature current signal produced by the amplifier 111. Such signal prevents the gating circuitry 130, 131 from switching from the field to the armature control mode during regenerative braking until the current being returned to the battery falls to a predetermined level such as 60 amps.

The gates 140, 144, in addition to being driven by the Q and $\overline{Q}$ outputs of the flip flop 133 have additional inputs which will be described in greater detail with reference to FIG. 3. Suffice it for the moment to note that the $\overline{ACCEL}$ signal is coupled to the gate 140 so that when the accelerator is depressed in the armature control mode the gate 140 is enabled, thereby to energize the relay driver 141. The armature current signal produced by the amplifier 111 is also coupled to the gate 140, and serves to maintain the gate locked in until armature current falls below a predetermined level. Both the gates 140 and 144 have inputs connected to a starting and safety circuit 160 such that both gates are disabled until an active signal is produced by the starting and safety circuit. The details by which such signal is produced are not material to an understanding of the present invention. Suffice it to note that the signal is produced when the operator follows a preset procedure in "starting" the vehicle and appropriate safety sensing circuits are in their proper condition. The gate 144 has a further signal responsive to the armature voltage, representing a further safety feature, which prevents mode switching to the field control mode under conditions to be specified below.

In accordance with the present invention, means are provided for sensing the operating level of the controller and programming the energy in the commutating inverter in accordance with such operating level. To that end a gate circuit 170 has inputs connected to the actual armature current signal produced by the amplifier 111 and to the demanded armature current signal produced by the accelerator potentiometer 105. The gate circuit 170 serves to pass the signal corresponding to the higher operating level to a comparator 171. The gate 170 also responds to a low $\overline{Q}$ output from the flip flop 133, indicating the system is in the field control mode, and also to the chopper-full-on signal produced by the amplifier 150 to modify the output signal in the field control mode. The output signal from the gate 170, whether it be the armature current signal actual or demanded, or the modified signal produced by the last two mentioned inputs can be considered a signal related to the operating level of the controller.

A comparator 171 serves to compare such signal with a signal related to the energy level in the commutating circuit so as to produce a clamping signal at the appropriate point limiting or terminating energy buildup in the commutating circuitry. In the illustrated embodiment the energy level in the commutating circuit is sensed by connecting the clamp windings 42-3, 43-3 (FIG. 1) to an expanded scale voltmeter 173 for monitoring energy buildup. For relating the voltage on the clamp windings to the actual battery terminal voltage, a voltage divider 176 is connected across the battery and has a junction 177 connected as a reference to the expanded scale voltmeter 173. In operating, as the voltage on the clamp windings builds up, the expanded scale voltmeter will produce a positive going signal which is compared against the output of the gate 170 in the comparator 171. When such signals assume a predetermined relationship, the comparator 171 will respond by producing an output signal which serves to energize gating circuits 174, 175. As illustrated in the drawings, the gating circuits are connected to the SCR's 55, 56 arranged in the clamp circuit 24 shown in FIG. 1. Gate pulses will be produced by the circuits 174, 175 causing whichever of the SCR's 55, 56 is forward biased to conduct, thereby imposing the battery directly across the clamp winding, and terminating voltage buildup in the commutating inverter. Assuming for example, and referring to FIG. 1, that the upper portion of the commutating inverter is conducting, the energy stored in the primary 43-1 will be charging the commutating capacitors and increasing the voltage at junction 45a. At the time the SCR 56 is triggered, the battery will be imposed across the secondary or clamp winding 43-3, thereby transferring the energy present in the primary 43-1 back to the propulsion battery 20 via the clamp winding, and terminating the voltage buildup at the junction 45a. It will now be apparent that the point at which that occurs is dependent upon the operating level of the inverter such that the clamp is imposed at a point in the cycle of the inverter which results in sufficient but not excessive energy in such inverter to commutate the next cycle of the chopper. Power losses in such elements are thereby minimized.

With the foregoing overview of the system in mind, attention will now be directed to additional detail of certain of the system elements thought to be useful for a complete undstanding of the invention. For example, since according to one ancillary aspect of the invention, means are provided for causing the controller to operate in separate armature and field control modes, additional detail will be provided on the mode switching circuitry. Furthermore, because the exemplary chopper is a variable duty cycle device, additional detail will be provided on the duty cycle control. With respect to elements not directly involved in the structure and operation of the present invention, but nevertheless forming a part of the overall electric vehicle, the reader is referred to the aforementioned patents and the preceeding general description.

Figure 3:
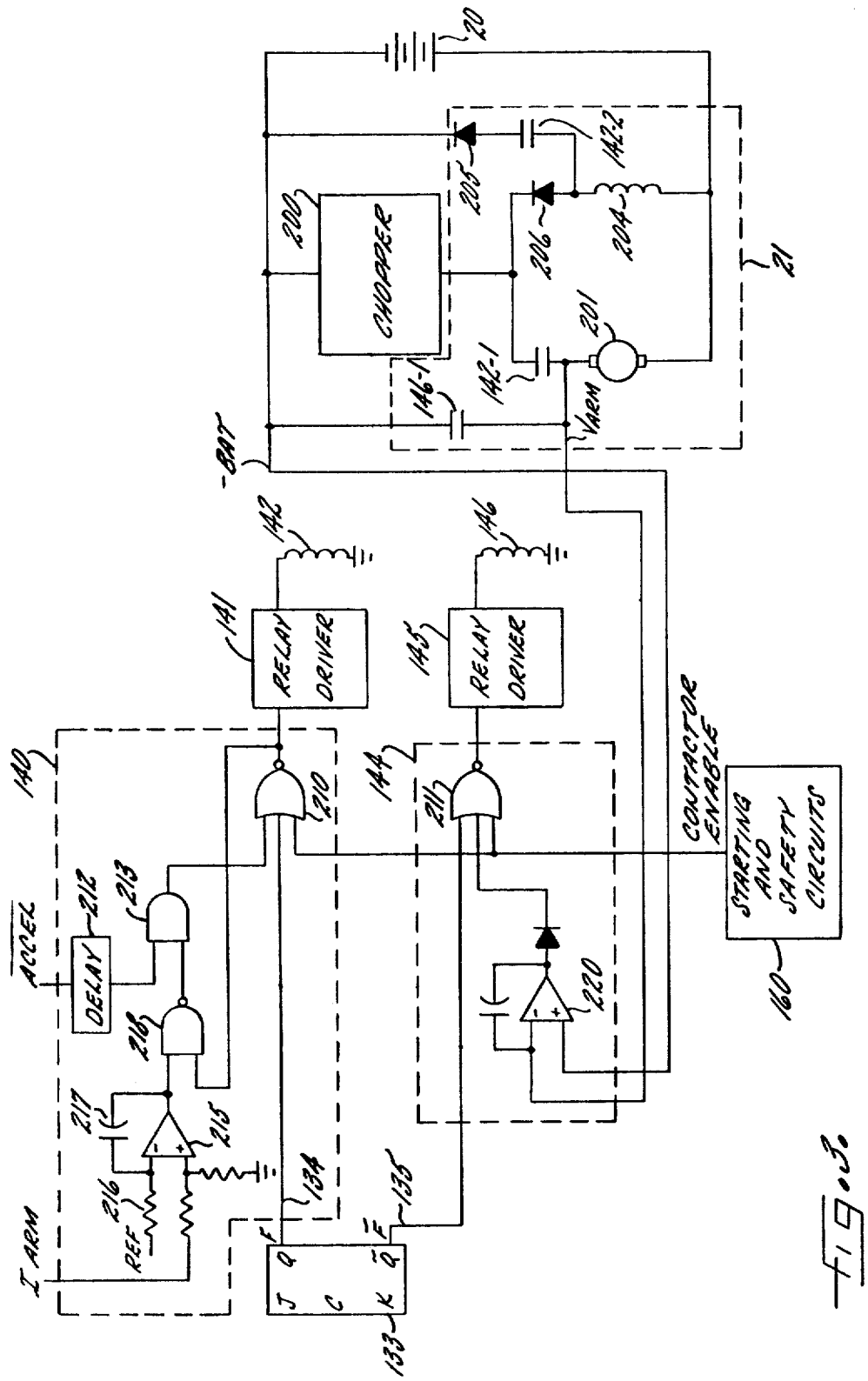
FIG. 3 is a block diagram showing the mode switching elements for the power converter of FIG. 1.

Turning now to FIG. 3, there are shown the mode switching elements in greater detail justaposed with the power switching elements in the chopper and motor circuitry. The mode control flip flop 133 is shown having a Q output 134 connected to gate circuitry 140 and a $\overline{Q}$ output 135 connected to gate circuitry 144. The associated relay drivers 141, 145 and relay coils 142, 146 are also illustrated. Relay 142 has two sets of contacts, a first set 142-1 serving to connect the motor armature 201 directly to the output of the chopper 200, while a second set 142-2 connects the motor field 204 to the negative terminal of the battery 20 via a protection diode 205. The diode 205 is interposed to protect a switching diode 206, during the time the contacts 142-2 are closed, from high negative transients which might be generated by the armature 201. The relay 146 has a single set of contacts 146-1 which serve to connect the motor armature 201 directly to the negative terminal of the battery 20. Switch means for the field 204 in the field control mode comprises a diode 206 which becomes forward biased after the armature control mode relay 142 is deenergized, imposing the output of the chopper 200 across the motor field 204.

As described in the aformentioned patents, in order to efficiently combine the capabilities of the chopper and the separately excited DC motor, means are provided for operating the system in an armature control mode wherein the chopper is connected to the motor armature while the battery is connected directly across the field, and for operating the system in a field control mode wherein the armature is connected directly to the battery while the chopper is connected to the motor field. To that end, when the armature mode relay 142 is energized, contacts 142-1 connect the chopper to the motor armature and contacts 142-2 connect the field directly across the battery. Also as noted in the aformentioned patents, mode switching occurs only when the chopper is at maximum operating level. In that condition the output of the chopper and the battery are at substantially the same potential, such that the mode switching contacts are not subjected to great electrical stresses. To switch from armature to field control, the relay 146 is energized, closing contacts 146-1, thereby connecting the armature 201 directly across the battery. Switch means for the field comprise diode 206 which connects the motor field 204 to the chopper 200. Relay 142 is de-energized, opening the contacts 142-1, thereby disconnecting the armature from the chopper, and opening contacts 142-2 which thereupon forward biases the diode 206 such that the chopper controls the field current.

The gate circuits 140, 144 which control mode switching of the power contacts are illustrated in greater detail in FIG. 3. The mode control flip flop 133 has Q and $\overline{Q}$ outputs 134, 135 respectively which serve as mode switching inputs to the gate circuits 140, 144 respectively. It is seen that the Q output 134 is connected to a multiple input NOR gate 210 while the Q output 135 is connected as an input to NOR gate 211. The starting and safety circuits 160 are connected to each of the gates 210, 211 and serve as a gross enabling signal. Whenever the starting and safety circuits are satisfied, the contacter enable output is low, providing a preliminary enabling signal for the NOR gates 210, 211. With the system at rest the Q output 134 is low and the $\overline{Q}$ output 135 is high. When the accelerator is depressed the $\overline{ACCEL}$ signal is brought low. That low signal passes through delay circuit 212 to produce a low on the input of AND gate 213. The output of such gate thereupon switches low, causing the output of NOR gate 210 to switch high. The high signal at the output of NOR gate 210 activates the relay driver 141 which energizes the relay coil 142, closing the contacts 142-1 and 142-2, setting the power circuit up in the armature control mode.

As described in connection with FIG. 2, the appropriate portion of steering gate 117 is activated, causing the production of a chopper command signal which causes the duty cycle control 123 to increase duty cycle so as to produce an armature current matching the demanded armature current established by acceleration potentiometer 105. If the duty cycle advances to 100% and additional acceleration is demanded the flip flop 133 will be clocked as described previously. As a result the Q output 134 is driven high, causing the output of NOR gate 210 to swing low. That deactivates the relay driver 141 and de-energizes relay 142. Additionally, the low $\overline{Q}$ output is applied as an input to NOR gate 211, causing the output of such NOR gate to swing high, activating relay driver 145 and energizing relay coil 146. The contacts in the power circuit switch as described previously to establish the power portion of the circuit in the field control mode. The steering gate 117 passes the inverted error signal to reduce the duty cycle of the chopper via duty cycle control 123 until the actual armature current matches the demanded. Mode switching from field to armature control mode occurs in a similar manner upon clocking of the flip flop 133 to reverse the condition of Q and $\overline{Q}$ outputs 134, 135, thereby to activate relay driver 141 and deactivate relay driver 145.

The additional inputs to NOR gates 210, 211 are provided for purposes now to be described. Initially, it is noted that the delay circuit 212 provides a delay on de-activation such that if the driver removes his foot from the accelerator while in the armature control mode, the output of AND gate 213 will switch high only after a predetermined delay. Additionally a sensing amplifier 215 is provided which matches the armature current signal against a predetermined reference 216 so as to prevent dropout of the armature control relay 142 until armature current has decayed to a predetermined level. To that end, the armature current signal is connected as an input to amplifier 215 which matches such input against reference 216. Capacitor 217 is provided for a slight integrating effect. The output of the amplifier serves as an input to NAND gate 218 which has a second input driven by the output of NOR gate 210. As a result, when the armature control mode is entered, the high output of NOR gate 210 provides an enabling signal to NOR gate 218. With armature current above the reference level the second input to NAND gate 218 is also high. As a result the output of NAND gate 218 will remain low, maintaining the output of AND gate 213 low and thereby the energization of relay 142. Even if the driver removes his foot from the accelerator, causing the $\overline{ACCEL}$ signal to switch high, the NAND gate 218 will maintain relay 142 energized until armature current drops below the reference level, at which time the associated input of NAND gate 218 will switch low and cause the output of AND gate 213 to switch high. That high signal acts through NOR gate 210, switching its output low and de-energizing the relay driver 141.

An amplifier 220 is provided having an output connected to an input of NOR gate 211 to serve a safety function now to be described. Stated simply, the amplifier 220 compares the voltage across the armature to that of the negative terminal of the battery and prevents switching from armature to field control mode when the armature voltage is greater than the battery voltage indicating a high back EMF. Such circuitry prevents switching to field control mode in an unusual situation where the motor is developing a high counter EMF but the other elements of the mode switching circuitry fail to detect such condition. For example, if the vehicle is coasting at relatively high speeds (say 40 miles per hour) and the operator removes his foot from the accelerator, the controller can switch from field to armature control mode, the duty cycle can be reduced and the controller can ultimately open relay 142. If the vehicle is coasting such that it maintains speed, when the operator later depresses the accelerator, the circuitry detects a demand for armature current. However, because the motor back EMF is greater than the battery voltage, current cannot flow to the armature, and in attempting to produce armature current to match the demand signal, the controller will increase the duty cycle to full-on and attempt a switch to the field control mode. If such switch were allowed, the armature would be imposed directly across the battery with full field, generating substantial regenerative braking currents due to the high motor speed. To prevent such an occurrence the amplifier 220 maintains a high output signal until the voltage across the armature approaches the negative battery terminal voltage, indicating a safe condition. Mode switching will then occur in the normal fashion.

Figure 4:
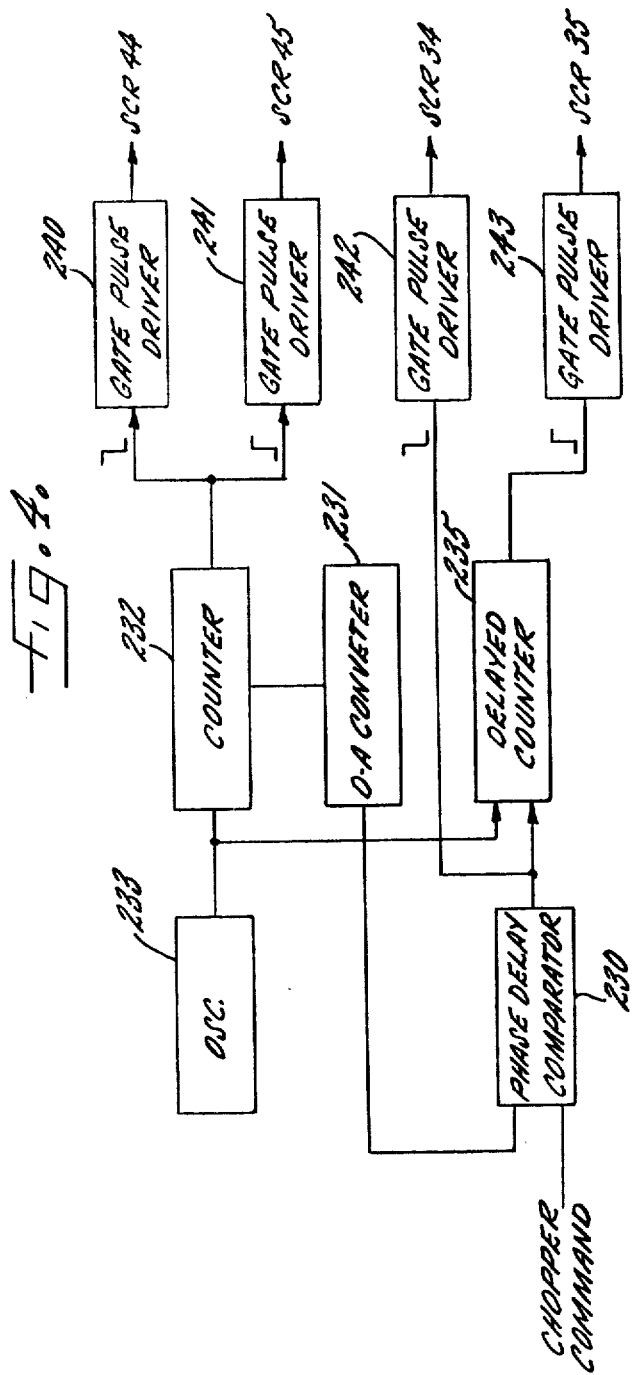
FIG. 4 is a block diagram illustrating duty cycle control means for the power converter.

Turning now to FIG. 4, there is shown in block diagram form the duty cycle control for the chopper. Reference can be made to the aforementioned patents for a more detailed description of the circuitry. The chopper command signal described in connection with FIG. 2 is applied as an input to a phase delay comparator 230. Such signal is compared to an analog signal produced by D/A converter 231 which responds to the digital output of a counter 232 to produce a negative ramp signal as the counter fills. The counter 232 has its clock input coupled to a stable oscillator 233 which provides the main clock signal for the chopper. The oscillator 233 also has its output connected to a delayed counter 235. The delayed counter 235 has an enabling input connected to the phase delay comparator 230.

In operation the oscillator 233 continues to cycle the counter 232 to produce a square wave output of about 400 Hz. Negative transitions of the square wave activate a gate pulse driver 240 to gate the commutating SCR 44 whereas positive transitions energize a gate pulse driver 241 to gate the commutating SCR 45. Accordingly, the commutating SCR's are driven at a fixed frequency and 180° out of phase. The duty cycle of the chopper is controlled by varying the incremental time in advance of firing the commutating SCR's at which the associated chopper SCR's are fired. To that end the phase delay comparator 230 responds to the level of the chopper command signal and the negative ramp signal produced by the D/A converter 231, which in turn is responsive to the count within the cycling counter 232. When such signals are in a predetermined correspondence the phase delay comparator 230 produces an output signal which energizes gate pulse driver 242 to fire the chopper SCR 34. At the same time the phase delay comparator 230 removes a reset signal from the delayed counter 235 enabling it to count pulses produced by the oscillator 233. When the delayed counter 235 fills it produces an output signal which energizes gate pulse driver 243 to gate the chopper SCR 35. The counter 232 and delayed counter 235 have the same number of binary stages such that the delay period during which the delayed counter 235 is held in reset by the phase delay comparator serves to slave the SCR 35 to the conducting interval of the SCR 34. When the chopper is operating at relatively low duty cycles, the counter 232 is allowed to advance well into its count before the phase delay comparator produces a signal to trigger the SCR 34 and remove the reset from the delayed counter 235. As a result, the commutating SCR 44 will be fired quite soon after firing the chopper SCR 34 so that the conducting interval of the leg of the chopper will be relatively short as compared to the overall period. When high duty cycles are demanded by the chopper command signal, the phase delay comparator will trigger the gate pulse driver 34 and remove the reset from the delayed counter 235 quite early in the period, so that the SCR 34 is conductive for a considerably longer proportion of the total operating period. As noted above the SCR 35 is slaved to the operating period of the SCR 34 by the delayed counter so that the duty cycles of the respective legs are matched.

Because the current conducted by the chopper is directly related to the duty cycle as well as to the load presented to the chopper, the amount of energy necessary to commutate the chopper is also dependent on such factors. In contrast to simply arranging the commutating circuitry for the worst case demand on the chopper, in accordance with the present invention means are provided for programming the amount of energy in the chopper in dependence on commutating demands. To that end means are provided for sensing the operating duty cycle of the chopper and also the mode in which the controller is operating, such means being so constructed and arranged as to control the energy in the commutating inverter in accordance with the sensed conditions.

Referring to FIG. 5 there is shown the details of the gate circuitry 170 including an amplifier 250 having an input responsive to the armature current signal produced by amplifier 111 (FIG. 2) so as to produce an output signal relating to actual armature current. The gating circuit 170 includes a further input 251 coupled to the wiper of the acceleration potentiometer 105 (FIG. 2) so as to produce a signal indicative of demanded armature current. Isolating diodes 252, 253 couple such signals to a summing junction which responds to the larger of the two thereby to produce an output having an analog level related to the greater of the actual or demanded armature current. Such signal is coupled to an input of comparator 171 comprising a high gain amplifier 257, the output of which is coupled via capacitor 258 to a pair of gating circuits 174, 175. As noted previously such gating circuits couple triggering pulses to the programming SCR's 55, 56 in order to fire whichever of those SCR's is forward biased.

In practicing the invention the analog signal produced by the amplifier 255 relating to the greater of the demanded or actual armature current is compared to a signal related to energy in the commutating circuit for determining the point at which energy buildup in the commutation circuit is to be terminated. To that end the expanded scale voltmeter 173 has a pair of inputs 260, 261 coupled to the clamp windings in the power circuit. Because the area of concern in detecting the clamping point is the resonant exchange of energy from the inductor to the commutating capacitors, and because the voltage across the clamp windings is negative during such time, a pair of properly polled isolating diodes 262, 263 connect the clamp windings to the invertering input of an amplifier 265 in the expanded scale voltmeter. The amplifier 265 is biased to amplify the negative portion of the voltage across the clamp winding and couple such amplified voltage to the non-inverting input of the comparator amplifier 257. As a result, the increasing ramp voltage applied to the non-inverting input of amplifier 257 is compared to the positive level representative of operating level which is coupled to the inverting input thereof. When such signals reach a predetermined relationship the output of amplifier 257 swings positively, coupling a pulse through capacitor 258 to energize the gating circuits 174, 175. Assuming, for example, that the clamp winding 43-1 were the one across which voltage was building up, the SCR 47, due to the turns ratio of the transformer 43 would become forward biased rather early in the resinant cycle of the commutating inverter. Accordingly, at the point determined by the relationship between the signals applied to the comparison amplifier 257, the gate signal would be coupled to the forward biased SCR 55, causing that SCR to conduct and clamp the battery voltage across the clamp winding. The effect is to transfer the current flowing in the commutating inverter through the clamp winding for return to the battery, thus terminating voltage buildup across the commutating capacitor. As a result, the capacitor voltage is established for the next resinant cycle of the commutating inverter at a level sufficient to commutate the SCR at its operating level while eliminating excess energy in the commutating inverter by transferring such energy back to the battery at a point determined by the operating level.

Because the terminal voltage of the battery can vary over a reasonably wide range, considering the state of battery charge as well as whether or not the system is in the regenerative braking mode, means are provided for compensating the programming circuitry for such battery terminal voltage variations. To that end, the amplifier 265 has its non-inverting input 267 connected to a voltage divider which in turn is connected across the propulsion battery. Accordingly, there is provided a variable reference signal indicative of battery terminal voltage for modifying the program point in dependence on the state of the battery. As a result, it is not necessary to set the program point for a fixed battery terminal voltage and tolerate increased losses in the commutating circuitry as the battery voltage falls off.

In the preferred electrical vehicle wherein a single chopper is used in separate armature and field control modes, means are provided responsive to the relatively light chopper load field control mode for modifying the program circuitry to provide minimum energy in the commutating inverter. It was noted previously that in the armature control mode, the chopper can deliver in the order of 500 amps, whereas in the field control mode approximately 5–10 amps is more typical. Accordingly, the $\overline{Q}$ output of flip flop 133, the low state of which is indicative of the field control mode, is coupled as an input to NOR gate 270 in the gating circuit 170. Assuming that the other input of NOR gate 270 is also at a low level, the output thereof will be high, such high signal acting through an isolating diode 271 to swamp the input of amplifier 255, driving its output to a minimum positive level. As a result, the comparator 257 will respond very early in the resinant cycle of the commutating inverter to cause clamping with a correspondingly lower voltage across the commutating capacitors. Since the chopper is operating at relatively light loads in the field control mode, such level is selected to provide sufficient energy for commutation at a relatively low energy level, thus making the chopper very efficient in high speed cruising.

In order to prevent commutation failure during mode switching in from the field to the armature control mode, means are provided for anticipating such mode switch and increasing the energy in the commutating inverter. To that end, an inverter 272 has an input coupled to the chopper-full-on signal produced by amplifier 150 (FIG. 2). Normally such input signal is at a high logic level, maintaining the associated input of NOR gate 270 low. However, when the chopper-full-on signal becomes active, its logic level falls low, driving the output of inverter 272 high and thereupon the output of NOR gate 270 low. As a result the positive signal previously applied to the input of amplifier 255 is removed, allowing the amplifier to respond to the greater of the actual or demanded armature current, thereby retarding the point in the cycle at which the programming SCR's are fired, and increasing the energy in the commutating inverter. As a result, if and when a switch to the armature control mode occurs, sufficient energy will be present in the commutating inverter to accommodate the drastically increased current flow through the chopper resulting when the chopper is switched from the motor field to the motor armature.

Reference will now be made concurrently to FIGS. 1 and 6 for a better understanding of the effect of the programmable commutation circuitry. FIG. 6a shows the voltage across a primary winding in the commutating inverter while FIG. 6b shows the voltage across the associated clamp winding. Assuming that the curves relate to transformer 43, it is seen that at the point 280 when SCR 47 is triggered to commutate the associated leg of the chopper the voltage stored in the commutating capacitors 44, 45 instantaneously appears across the primary 43-1. Such voltage is indicated at a peak 281 and has a value determined by the clamp point in the previous cycle of the commutating inverter. The commutating inverter then begins a resonant exchange of energy between the commutating capacitors and the primary 43-1. At the point 282 capacitor voltage has fallen to zero, and the energy is stored in the commutating inductor 43-1. It is noted that the stored energy is due not only to the charge initially stored on the capacitors, but also to current drawn from the battery, as well as the energy in winding 43-2 due to chopper current. Current flow which is maintained by the primary will cause the capacitor 45 to charge in the reverse direction. Because the energy in the primary is due not only to the initial charge, but also to current flow from the battery, the voltage will attempt to charge to the original level plus approximately the battery terminal voltage, such point being indicated at 283. If the voltage were allowed to ring to the point 283, excessive energy would be present in the commutating inverter upon the next resonant cycle.

FIG. 6b shows the corresponding voltages measured across the clamp winding 43-3. It is seen that the positive portion follows the positive portion of the primary voltage, although the magnitudes may be different due to the turns ratio. At the point 282 the diode 263 referred to in connection with FIG. 5 becomes forward biased, and the amplifier 265 reproduces the negative going ramp signal 284 on an expanded scale basis. For the condition being studied it is assumed that the voltage at point 285 is the point at which the comparator 257 detects the predetermined correspondence between the voltage in the commutating circuitry and the demanded level and causes the triggering of SCR 56. The triggering of SCR 56 at the point 285 causes the imposition of the battery voltage across the clamp winding 43-3 via the conductive SCR 56. As a result the voltage across the clamp winding falls to a level indicated at 286 which is substantially the terminal voltage of the battery. Current flow in the clamp winding 43-3 which had been 0 up to that point suddenly increases sharply, returning the excess energy to the propulsion battery. When the energy is returned at point 287, current flow in the SCR 56 terminates and the commutating inverter cycle is completed.

Referring again to the FIG. 6a, the effect of clamping can be observed. As noted previously, without clamping voltage would ring to the point 283. The crosshatched portion of FIG. 6a indicates the energy in excess of requirements which would have been transferred to the commutating inverter. With clamping occuring at point 285, the voltage across the commutating capacitors is limited to the level indicated at 288. The energy indicated by the cross hatched portion 289, rather than causing unneeded buildup in the commutating inverter, is transferred to the propulsion battery as indicated by the cross hatched portion 289 of FIG. 6b. The areas of such cross hatched portions are approximately equal.

Figure 7A:
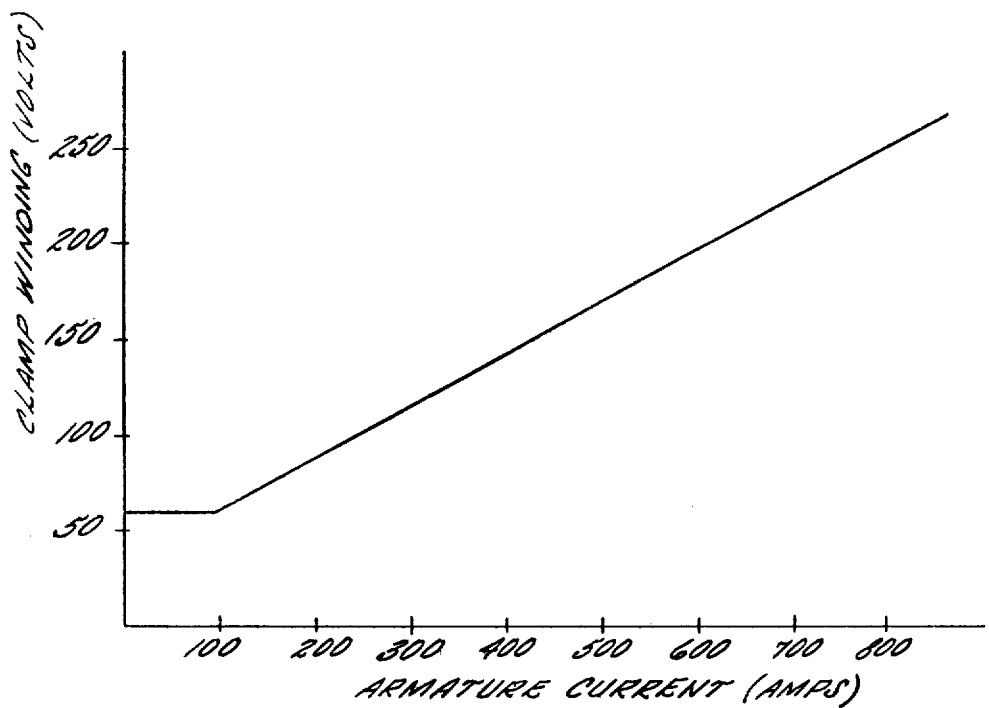

Because the operating level of the commutating inverter does not change drastically from cycle to cycle, but can do so over a brief operating interval, the dramatic effect of programmable commutation is best illustrated by the curves of FIG. 7. FIG. 7a shows, for an exemplary embodiment of the invention, the voltage across the clamp winding at the start of the clamp interval versus armature current. It is noted that such voltage is the one sensed across the clamp windings for comparison against the actual or demanded armature current signal for terminating the resonant exchange of energy in the commutating inverter. It is seen that at low chopper current, below about 100 amps, the sensing point across the clamp winding is about 60 volts. Beyond 100 amps the clamp winding voltage increases, reaching about 250 volts at 800 amps chopper current. The illustrated relationship is linear because it was convenient to use such linear relationship in the exemplary chopper. However, it is entirely possible, depending on the characteristics of the power converter to adapt the curve to match the conditions in interest.

Figure 7B:
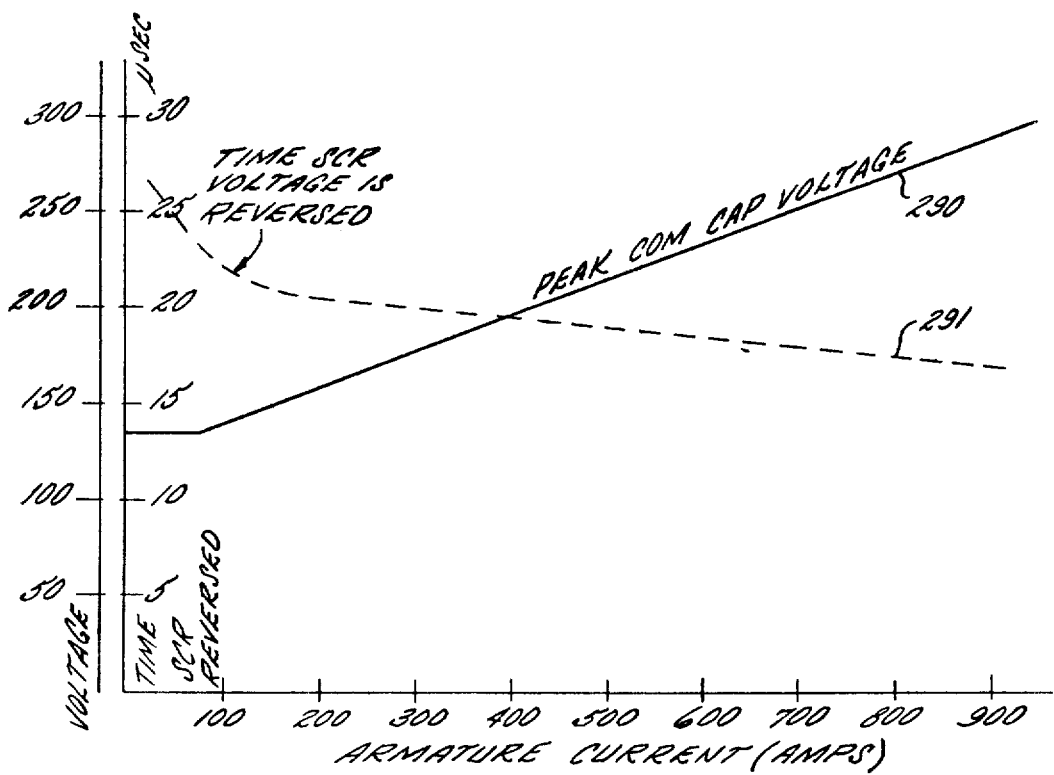

FIG. 7b shows the effect of clamping at the voltages indicated in FIG. 7a on the commutating inverter and on the chopper. The curve 290 illustrates the peak voltage across the commutating capacitors as a function of armature current. Below 100 amps the peak value is limited to about 135 volts. Beyond 100 amps the peak commutating capacitor voltage rises, ultimately reaching about 290 volts at 900 amps chopper current.

The curve 291 indicates the duration of the interval during which the voltage across the chopper SCR is reversed, in effect showing the commutating interval. It is seen that the commutation interval remains relatively constant from fairly low currents, say about 150 amps up to maximum current of 900 amps, varying from about 21 microseconds in the former condition to about 17.5 microseconds in the latter condition. It will now be apparent that not only is energy in the commutating circuit limited in accordance with actual commutation demands, but also that such limitation is accomplished in a manner which provides for reliable commutation of the high current chopper SCR's.

It will be noted that in the exemplary embodiment described herein, presently considered to be preferred, the power converter was described as a dual chopper operable at a variable duty cycle for delivering controlled power to the motor. However, it will be clear to those skilled in this art that the invention has broader applicability, and can be used with other power converters having auxiliary commutation circuits wherein it is desired to increase efficiency by programming the amount of energy in the auxiliary commutation circuit according to the operating level of the converter.

We claim as our invention:

1. An improved power converter operable from a DC power source comprising in combination a thyristor controlled chopper, means for varying the operating level of the chopper for delivering a variable power output to a load over a relatively wide range, a commutating inverter for commutating the chopper thyristor, a transformer coupling the commutating inverter to the chopper for delivering commutation energy thereto, the transformer also having a clamp winding, control thyristor means in series with the clamp winding and across the power source, and program means for firing the control thyristor to terminate the cycle of the commutating inverter at a point dependent on the operating level of the chopper, thereby to program the amount of energy in the commutating inverter for limiting losses therein.

2. In a power converter operable from a DC power source and having a chopper, means for varying the operating level of the chopper for delivering a controlled output power to a load over a relatively wide range, commutating inverter means for commutating the chopper, the commutating inverter including transformer means for coupling energy from the commutating inverter to the chopper for commutation thereof, the improvement comprising, clamp winding means on said transformer means, thyristor means in series with the clamp winding means and across the battery, the clamp winding means having a sufficient number of turns to forward bias the thyristor means over a substantial portion of the cycle of the commutating inverter, and means responsive to the operating level of the chopper and the energy level in the commutating inverter for triggering said thyristor means to terminate the cycle of the commutating inverter at a point programmed in dependence on the operating power level of the controller, thereby to reduce power losses in the commutating inverter.

3. The improvement as set forth in claim 2 wherein the means responsive to the energy level in the commutating inverter includes means for sensing the voltage on the clamp winding means.

4. The improvement as set forth in claim 3 including means for producing a variable reference signal related to power supply terminal voltage, and wherein the means for sensing the voltage on the clamp winding means includes means responsive to the variable reference signal for compensating the triggering of said thyristor means to compensate for variations in said terminal voltage.

5. The improvement as set forth in claim 4 wherein the means responsive to said energy level comprises an expanded scale voltmeter.

6. The improvement as set forth in claim 2 wherein the controller is used to drive a DC motor, and including means for connecting the controller in a first mode for controlling the motor armature and means for connecting the controller in a second mode for controlling the motor field, wherein the improvement further comprises means responsive to operation of the controller in said second mode for programming the commutating means to operate at a minimum level, thereby to minimize commutating inverter losses when controlling the motor field.

7. The improvement as set forth in claim 6 wherein the improvement further comprises means for anticipating a switch of said converter from the second to the first mode, and means responsive to the anticipating means for programming an increase of energy in the commutating inverter, thereby to preclude commutation failure upon mode switching.

8. The improvement as set forth in claim 7 wherein the anticipating means includes means responsive to the operating level of the chopper for detecting the maximum operating level thereof as a precondition to mode switching.

9. The improvement as set forth in claim 2 wherein the means responsive to the operating level of the chopper includes means for detecting the current delivered by the chopper, means for detecting the current level demanded of the chopper, and means responsive to the largest of said actual or demanded current levels for programming the energy in the commutating inverter.

10. An improved power controller operable from a DC power source comprising in combination a thyristor controlled power converter, means for varying the operating level of the converter for delivering a variable power output to a load over a relatively wide range, a commutating inverter including inductance means for commutating the converter thyristor, a clamp winding magnetically coupled to the inductance means, switch means in series with the clamp winding and across the power source, and program means for closing the switch means to terminate the cycle of the commutating inverter at a point dependent on the operating level of the converter, thereby to program the amount of energy in the commutating inverter.

* * * * *